Dec. 11, 1962     I. M. SWATMAN     3,067,981
GAS TURBINE ENGINE

Original Filed June 15, 1959     4 Sheets-Sheet 1

IVAN M. SWATMAN
*INVENTOR.*
BY John R. Faulkner
Keith P. Jerschling

ATTORNEYS

Dec. 11, 1962     I. M. SWATMAN     3,067,981
GAS TURBINE ENGINE

Original Filed June 15, 1959     4 Sheets-Sheet 2

IVAN M. SWATMAN
INVENTOR.

BY John R. Faulkner
Keith L. Zerschling

ATTORNEYS

Dec. 11, 1962

I. M. SWATMAN 3,067,981

GAS TURBINE ENGINE

Original Filed June 15, 1959

IVAN M. SWATMAN
INVENTOR.

BY

ATTORNEYS

Dec. 11, 1962     I. M. SWATMAN     3,067,981
GAS TURBINE ENGINE

Original Filed June 15, 1959     4 Sheets-Sheet 4

IVAN M. SWATMAN
INVENTOR.

BY John C. Faulkner
Keith L. Zerschling

ATTORNEYS

United States Patent Office 3,067,981
Patented Dec. 11, 1962

3,067,981
GAS TURBINE ENGINE
Ivan M. Swatman, Birmingham, Mich., assignor to Ford Motor Company, Dearborn, Mich., a corporation of Delaware
Original application June 15, 1959, Ser. No. 820,323. Divided and this application May 27, 1960, Ser. No. 32,230.
5 Claims. (Cl. 253—39)

This invention relates to a gas turbine engine and more particularly to a novel means for supporting a turbine wheel shroud and scroll assembly in a gas turbine engine.

This application is a divisional application of copending application Serial No. 820,323, filed June 15, 1959, for a Gas Turbine Engine.

In the present invention there is provided a gas turbine engine having a turbine wheel including a shaft rotatably supported in a housing. A turbine nozzle is supported adjacent the turbine wheel so that the gases of combustion produced in the engine may be directed by the nozzle against the blades of the turbine wheel. The nozzle is concentrically positioned with respect to the turbine wheel shaft preferably through a nozzle support member which is positioned against the shaft by means of a bearing, and through a plurality of radial pins which engage the nozzle support member and the nozzle. A space is provided between the turbine nozzle support member and the turbine nozzle in which a plurality of heat shields are positioned. Cooling air is fed to this space which absorbs heat from the turbine nozzle and the heat shields to prevent the bearing from overheating due to the heat supplied the nozzle from the motive gases of the engine.

A turbine shroud having an inner peripheral dimension greater than the outer peripheral dimension of the turbine nozzle is positioned over the turbine nozzle and is supported thereby in a sliding fit relationship. The turbine shroud extends in an axial direction a sufficient distance to surround the turbine wheel in spaced relationship thereto. Such a structure permits radial differential expansion between the turbine nozzle and the turbine shroud without causing appreciable stresses in either the nozzle or the shroud. It also permits relative axial movement between the turbine shroud and the turbine nozzle.

A turbine scroll assembly, comprising a turbine shroud retainer and a scroll for conveying motive gases to the turbine nozzle, is piloted from the turbine shroud. The shroud retainer is positioned over one end of the shroud and over a portion of the outer periphery of the shroud so that the portion of the shroud retainer which engages the shroud maintains a substantially fixed position relative thereto. Both the scroll and the shroud retainer have radially outwardly extending flanges which are affixed to each other. These flanges are supported by a radially extending portion of the housing in a sliding fit relationship so that the scroll can expand and contract in a radial direction relative to the housing as engine operating conditions change. The scroll also has an inwardly extending portion including an axially extending flange which surrounds a portion of the housing in a sliding fit relationship so that the scroll is free to expand and contract in an axial direction relative to the housing.

Means are provided to limit the axial movement of the shroud with respect to the turbine nozzle and this means may comprise a portion of the turbine scroll assembly which is capable of engaging both ends of the shroud. For example, a portion of the shroud retainer may be positioned over one end of the shroud, while a portion of the scroll may be positioned adjacent the other end thereof.

An object of the present invention is the provision of means for controlling the spacing between a turbine wheel and a shroud surrounding the turbine wheel during transient thermal conditions.

Another object of the invention is to provide a shroud for a turbine wheel which is supported by a turbine nozzle in a manner to permit differential expansion and contraction of the turbine nozzle in relation to the shroud.

Another object of the invention is to provide means for preventing overheating of turbine shaft support bearings due to the heat from the motive gases of the engine.

A further object of the invention is the provision of means for positioning a turbine scroll assembly relative to a turbine wheel and nozzle.

Still another object of the invention is the provision of means in a gas turbine engine for positioning a turbine scroll assembly relative to a turbine wheel and nozzle and for supporting the turbine scroll from the housing of the engine in such a way as to permit differential movement of the scroll relative to said housing during transient operating conditions of the engine.

Other object and attendant advantages of the invention will become more apparent as the specification is considered in connection with the annexed drawings in which.

Figure 1:
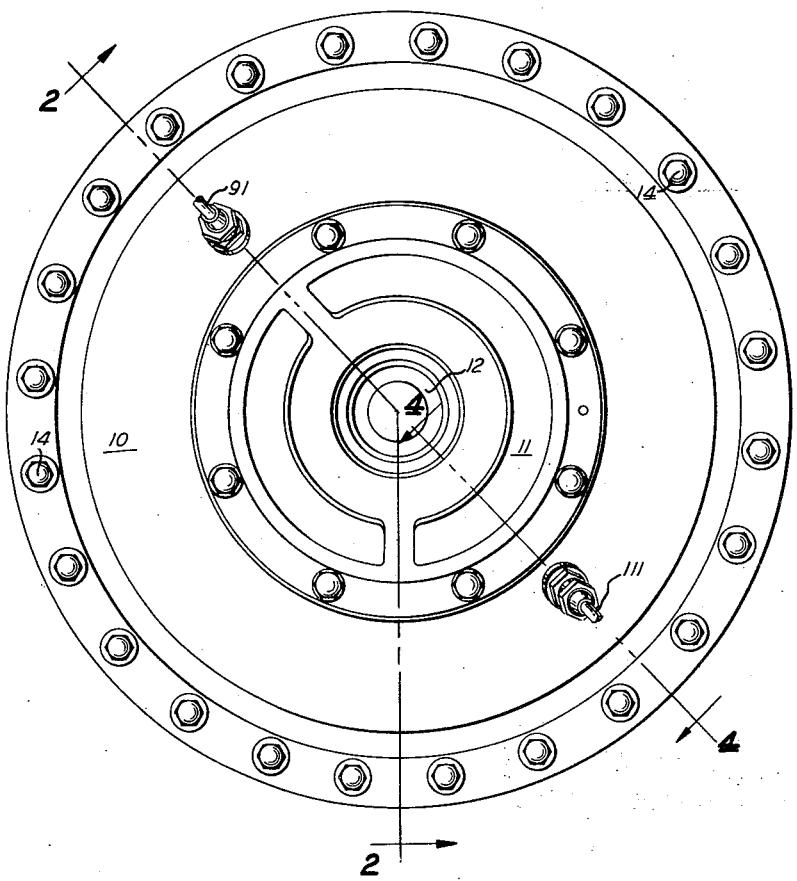
FIGURE 1 is a rear elevational view of a gas turbine engine in which the present invention may be employed.

Referring now to the drawings in which like reference numerals designate like parts throughout the several views thereof, the numeral 10 designates a first portion of the housing for the gas turbine engine of the present invention. This portion of the housing carries a support structure 11 in which the output shaft 12 of the engine is rotatably supported. The first portion of the housing is received in a second portion 13 and is secured thereto by suitable means such as a plurality of bolts 14.

Figure 2:
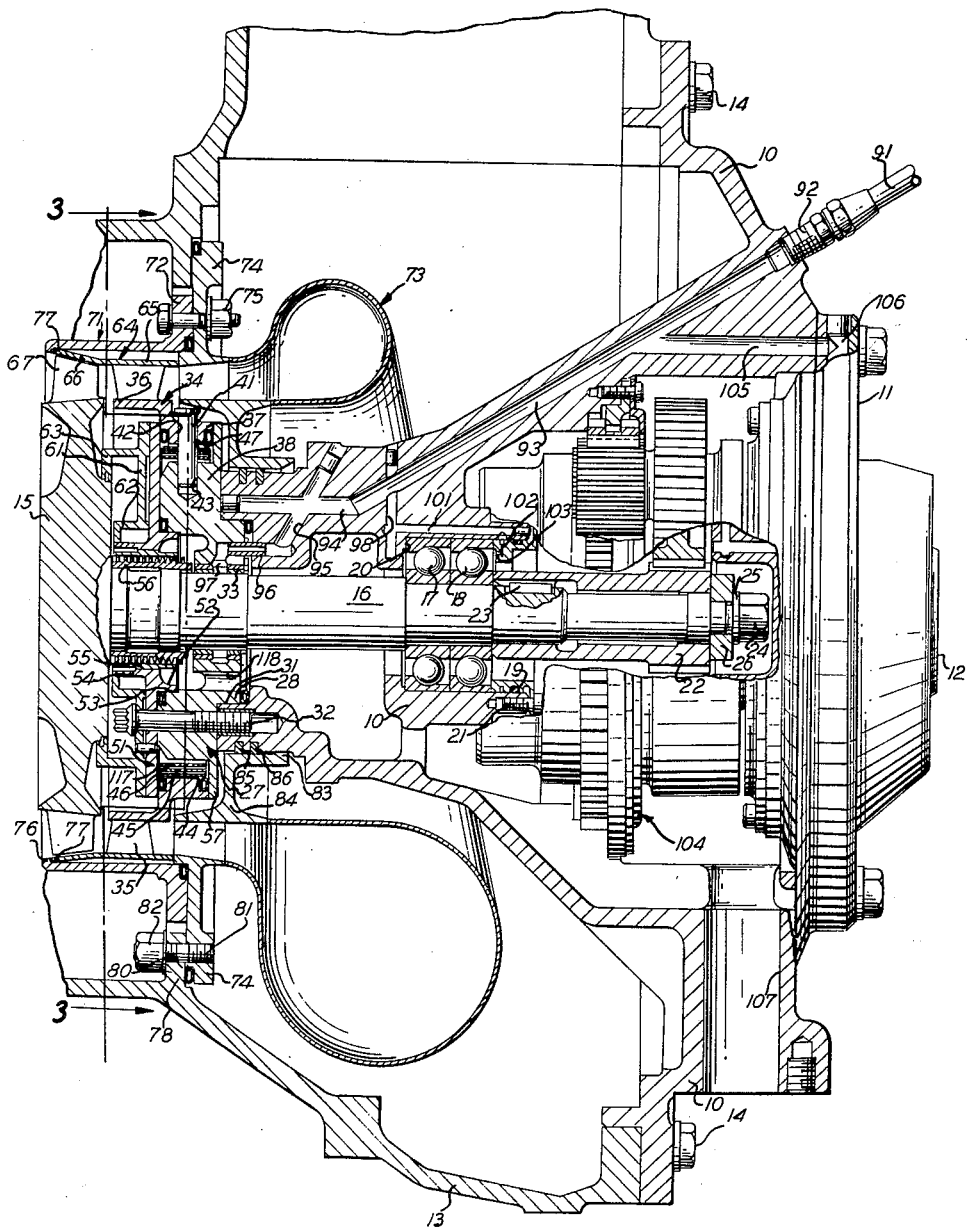
FIGURE 2 is a partial cross sectional view of the gas turbine engine taken along the lines 2—2 of FIGURE 1 with certain portions shown in elevation.

Referring specifically to FIGURE 2, a turbine wheel 15 including a shaft 16 is rotatably supported in portion 10 of the housing by means of a pair of antifriction bearings 17 and 18. The outer races of these bearings engage the housing 10 and are retained therein by means of a bearing retainer 19 which engages the outer race of bearing 18 and positions the outer race of bearing 17 against shoulder 20 of the housing. The bearing retainer is secured to the housing 10 by means of a plurality of screws, one of which is shown at 21. A sleeve 22 surrounding the shaft 16 and keyed thereto by means of a key 23, is forced against the inner race of the bearing 18 by means of a nut 24 threaded onto the shaft 16 which in turn forces the inner race of bearing 17 against a shoulder on shaft 16. The force of the nut is transmitted to the sleeve by means of washers 25 and 26. The turbine wheel 15 and the shaft 16 are thus rotatably supported in the housing 10 and are positively positioned axially in the housing 10 by the above described structure.

A turbine nozzle support member 27 having an axially extending box 28 fitting into a bore 31 in the housing 10 is positioned over the end of the housing 10 and is affixed thereto by means of a plurality of screws 32.

A sleeve type bearing 33 positioned between the turbine nozzle support member 27 and shaft 16, aids the bearings 17 and 18 in rotatably supporting the turbine wheel 15 and shaft 16 in the housing 10.

A turbine nozzle generally designated by the numeral 34, including a plurality of blades 35 supported from an outer platform 36 and an inner platform 37 having an inner peripheral dimension or diameter greater than the outer peripheral dimension of the main body portion 38 of the nozzle support member 27, is supported from the nozzle support member by a plurality of radial pins 41. These radial pins pass through bores 42 in the inner platform 37 of the turbine nozzle, through the annular space between the inner platform 37 and the main body portion 38 of the turbine nozzle support member and into bores 43 in the main body portion 38 of the turbine nozzle support member 27. The bores 42 in the inner platform of the turbine nozzle and the bores 43 in the main body portion 38 of the turbine nozzle support are made slightly larger than the diameter of the pins 41 so that the pins engage these two members in a sliding fit relationship. The radial outward movement of the pins is limited by the turbine scroll assembly as shown. The radial pins 41 thus position the turbine nozzle concentrically with respect to the shaft 16 but permit the turbine nozzle 34 to expand and contract radially during different operating conditions through sliding action on the radial pins.

A plurality of heat shields, preferably three in number, designated by the numerals 44, 45 and 46, and having different diameters are positioned in the annular space between the inner platform 37 of the nozzle 34 and main body portion 38 of the nozzle support member 27. The outer dimension of the largest heat shield 44 is less than the inner dimension of the inner platform 37 while the inner dimension of the smallest heat shield 46 is greater than the outer dimension of the main body portion 38 of the turbine nozzle support member 27. Each of the heat shields has a plurality of bores represented by the numeral 47 for receiving the radial pins 41 which support the heat shields in spaced relationship with respect to the inner platform 37 of the turbine nozzle and the main body portion 38 of the nozzle support member. The radial pins also support the heat shields in spaced relation to each other. The heat shields are preferably formed of a material having a highly reflective outer surface for purposes which will be described subsequently. The material employed is preferably stainless steel such as SAE 30321 or 30347.

A seal retainer 51, having an axially extending flange 52 positioned in a bore 53 in the turbine support member 27, is secured to the turbine support member by means of the screws 32 previously mentioned. The seal retainer has an axially extending flange 54 extending toward the turbine wheel 15 for carrying a sleeve 55 which surrounds a labyrinth seal 56 affixed to the shaft 15. The seal retainer 51 extends radially outwardly to a position approximately co-terminus with the outer periphery of the inner platform 37 of the turbine nozzle and forms an annular space together with a radially extending flange 57 on the turbine nozzle support member for receiving heat shields 44, 45 and 46 and the inner platform 37 of the turbine nozzle.

A cooling air seal 61 is positioned against the seal retainer 51 by means of the screws 32. This cooling air seal has a radially inwardly extending flange 62 which engages the axially extending flange 54 of the seal retainer 51 to properly position the arm 63 of the seal with respect to the turbine wheel 15.

Figure 3:
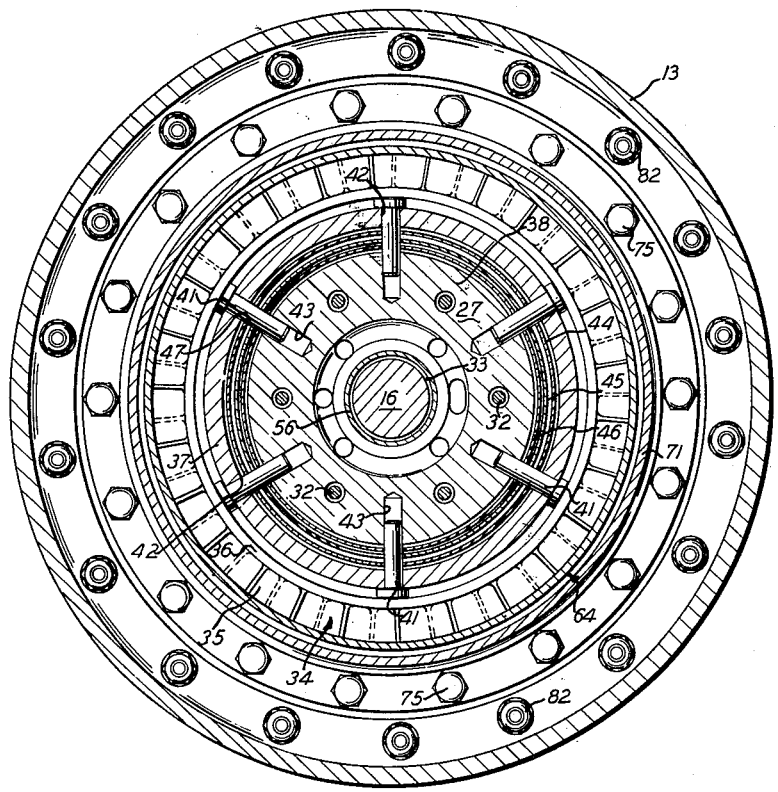
FIGURE 3 is a sectional view taken along the lines 3—3 of FIGURE 2.

The tips of the blades 35 of the turbine nozzle 34 preferably lie in an imaginary cylinder as is apparent from an inspection of FIGURE 3. A shroud 64 with a cylindrical portion 65 having an internal diameter slightly larger than the diameter of this imaginary cylinder is positioned over the tips of the nozzle blades so that the cylindrical portion of the shroud surrounds the tips of the nozzle blades in a sliding fit relationship. A portion 66 of the shroud extends axially and radially outwardly from the cylindrical portion 65 in spaced relationship over the tips of the blades 67 of the turbine wheel. Enough clearance is provided between the tips of the nozzle blades 35 and the cylindrical portion 65 of the shroud to permit differential radial expansion between these two members without setting up undue stresses in the shroud or the nozzle. This prevents warping of the shroud and maintains the concentricity of the shroud with respect to the tips of the turbine wheel blades during all operating conditions of the engine. For example, approximately .001" clearance may be provided between the tips of the nozzle blades 35 and the cylindrical portion 65 of the shroud around the entire circumference thereof for a nozzle approximately 8 inches in diameter. This clearance also permits relative axial movement between the turbine shroud and the nozzle blades.

A turbine scroll assembly is provided for supplying motive fluid—hot combustion gases from a combustion chamber (not shown)—to the turbine nozzle and turbine wheel. This turbine scroll assembly comprises a shroud retainer 71, having a radially outwardly extending flange 72, and a scroll 73 also having a radially outwardly extending flange 74. The radially outwardly extending flanges 72 and 74 are fastened together by suitable means such as bolt and nut assemblies shown at 75.

The shroud retainer 71 extends in spaced relation over the shroud 64, and has a radially inwardly extending flange 76 which fits over one end of the shroud and limits axial movement of the shroud in this direction. A small clearance is provided between the end of the shroud and the flange 76 so that stresses will not be set up in the shroud when the engine is operating at high temperatures. The shroud retainer 71 engages a portion of the outer periphery of the shroud as at 77 in a loose fit relationship, for example a few thousandths of an inch clearance is provided when the engine is cold, and this positions or pilots the turbine scroll assembly in the engine since the turbine scroll assembly is free to move radially or axially at other positions where it comes into engagement with the housing or other components of the engine as will presently be explained. The radially extending flange 74 of the scroll is supported by a radially inwardly extending flange 78 of the housing 13 through the studs 81 and nuts 82. The bores 80 in the housing 13 that receive the studs 81 are made considerably larger than the diameter of the studs and the nuts are torqued to a predetermined value to permit sliding between the faces of the flanges 74 and 78 which are machined to reduce friction. This permits the turbine scroll assembly which operates at considerably higher temperatures than the housing to grow radially as the turbine scroll assembly rises in temperature and to contract radially when the temperatures are lowered.

The scroll 73 also has an axially extending flange 83 which aids in supporting the main portion of the scroll through radially inwardly extending flange 84. The axially extending flange 83 surrounds a portion of the housing 10 which supports the bearings 17 and 18, the turbine wheel 15 and shaft 16. The flange 83 is supported by the housing through a pair of piston rings 85 and 86 thereby permitting freedom of movement of the scroll assembly at this position and providing a seal to prevent leakage of the hot combustion gases. This construction also permits liberal machining tolerances between the housing and the scroll. Axial expansion and contraction of the shroud assembly is permitted by reason of the fact that the main portion of the scroll 73 is made of thin metal that can deform under stress. Thus during transient thermal conditions the flange 83 may slide relative to the housing on piston rings 85 and 86 even though the flange member 74 is maintained stationary in an axial direction with respect to the housing.

It can be seen from an inspection of FIGURE 2 that the turbine nozzle support member 27 is positioned axially in the engine and is supported by the first portion 10 of the housing structure. This locates or positions the turbine nozzle 34 and the blades 35 axially in the engine. The turbine shroud 64 is positioned to be engaged by the radial flange 74 of the turbine scroll 73. The sliding fit relationship between the shroud 64 and the tips of the nozzle blades 35 permits relative axial movement between these two structures. It permits, therefore, axial dimensional changes between the first portion 10 of the housing and the second portion 13 of the housing to which the radial flange 74 is attached without setting up bending stresses in the nozzle 34 and the nozzle support member 27 which would occur if the shroud 64 and the nozzle 34 were formed integral. It can be seen that there may be axial differential expansion between the first portion 10 of the housing and the second portion 13 of the housing during transient temperature conditions. In this case, axial movement will take place between the shroud 64 and the turbine nozzle 34, since the radial flange 74 of the scroll 73 is positioned in engagement with and will move axially with flange 78.

Lubricating oil is conveyed to the housing 10 from a pump (not shown) by way of a conduit 91 which is threaded into the housing at 92. From the conduit 91 lubricating oil is supplied to the bearing 33 via conduits 93, 94 and 95, oil transfer tube 96 and groove 97. Lubricating oil is similarly supplied to the bearings 17 and 18 via conduits 93, 98, 101, 102 and 103.

A planetary reduction gear train generally designated by the numeral 104 and partially shown in FIGURE 2 is employed to reduce the speed of the turbine wheel shaft 16 so that usable speeds, to drive a load, such as a motor vehicle, are available at the output shaft 12. This gearing is lubricated with oil flowing through the conduits 93, 105 and 106. Since this gear train forms no part of the present invention, and any conventional gear train may be employed, a further explanation thereof is deemed unnecessary. The lubricating oil used in the lubrication of the bearings 17, 18 and 33 and the gear train 104 falls to the bottom of the housing 10 and may be scavenged through the bore 107 which may be suitably connected to a lube oil pump through conduits not shown.

Figure 4:
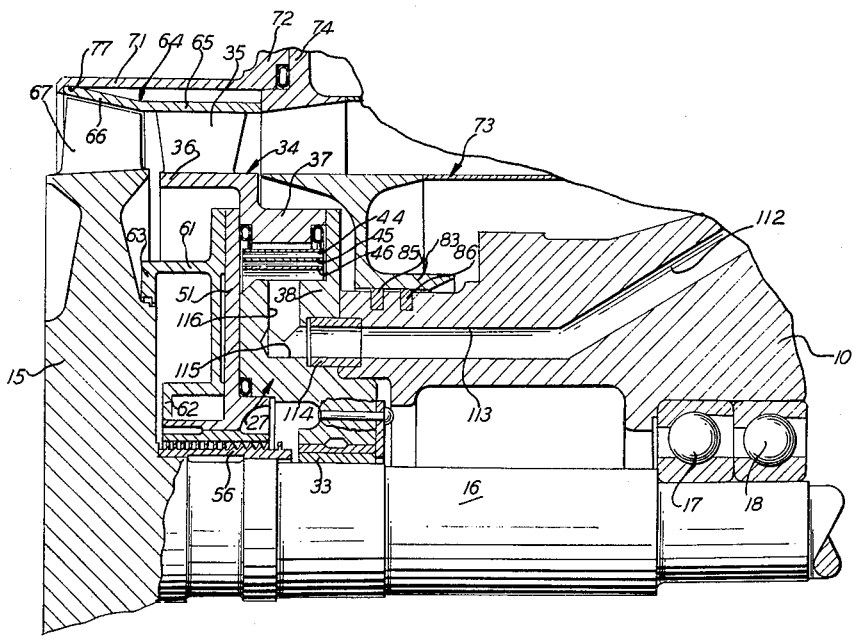
FIGURE 4 is a partial sectional view taken along the lines 4—4 of FIGURE 1.

Cooling air for the turbine wheel 15, the turbine nozzle 34 and the heat shields 44, 45 and 46 is supplied to the portion 10 of the housing, through conduit 111 (see FIGURE 1) from a suitable source (not shown). For example, this air may be bled from the compressor of the engine. Referring now to FIGURE 4, it can be seen that the air supplied from the conduit 111, flows through conduits 112 and 113 in the housing, through air transfer tube 114 positioned between the housing and the turbine nozzle support member 27, through bores 115 and 116 in the turbine nozzle support member into the space between the inner platform 37 of the turbine nozzle and the main body portion 38 of the turbine support member. The cooling air leaves this space via a plurality of air transfer tubes, one of which is shown at 117 in FIGURE 2. Cooling air under pressure fills the entire space between the inner platform of the turbine nozzle and the main body portion of the turbine support member as the cross sectional area of all the air transfer tubes 117 is less than the cross sectional area of the inlet bore 116. From this space the cooling air flows through the air transfer tubes 117 into the space defined by the turbine wheel 15 and the cooling seal 61 where it is maintained at a pressure approximately 1 p.s.i. above the gas flowing through the nozzle 35 and past the turbine blades 67. From this space the cooling air flows out into the gas stream through the restricted flow path defined between the turbine wheel 15 and the arm 63 of the cooling air seal 61. Cooling air also flows through the labyrinth seal 56 into the space between the nozzle support member 27 and the seal retainer 51 thereby preventing any lubricating oil from leaking through the labyrinth seal. From this space, the cooling air flows through the bore 118 in the nozzle support member 27 into the housing 10 where it may be exhausted to atmosphere through a breather in the housing (not shown). By maintaining the pressure of the cooling air in the space between turbine wheel 15 and the cooling seal 61 slightly above that of the combustion gases, the gases are prevented from flowing through the labyrinth seal 56 thus preventing hot combustion gases from reaching the bearings 33, 17 and 18.

As can be appreciated by the above description and by reference to the drawings, the cooling air not only cools the center of the turbine wheel 15 to prevent overheating of the turbine wheel and of the shaft 16, but also serves to remove heat from the heat shields 44, 45 and 46, the radial pins 41, the turbine nozzle 34 and the turbine nozzle support member 27 to prevent the bearing 33 from becoming overheated because of the heat from the nozzle 34. As previously pointed out, the heat shields are constructed of a material having highly reflective surfaces such as stainless steel. These highly reflective surfaces tend to reflect the heat emanating from the turbine nozzle 34, particularly inner platform 37 thereof, and thereby aid in preventing turbine nozzle support member 27 and bearing 33 from becoming overheated. The reflection of the heat radiated from the inner platform 37 of the turbine nozzle back against the undersurface thereof prevents a large thermal gradient across the inner platform thereby preventing overstressing and cracking.

Thus, the present invention provides a means for supporting a turbine shroud in concentric spaced relationship over the tips of the blades of a turbine wheel, as well as means for maintaining this concentricity during transient operating conditions of a gas turbine engine in which these means are employerd. In addition, the invention provides means for supporting a turbine scroll assembly in a gas turbine engine which will permit differential expansion and contraction of the scroll assembly with respect to housing of the engine during transient operating conditions.

It will be understood that the invention is not to be limited to the exact construction shown and described, and that various changes and modifications may be made without departing from the spirit and scope of the invention, as defined in the appended claims.

What is claimed is:

1. In a gas turbine engine, a housing, a turbine wheel including a shaft rotatably supported in said housing, a turbine nozzle, means for supporting said turbine nozzle adjacent said turbine wheel, a turbine wheel shroud positioned in a sliding fit relationship over the outer periphery of said turbine nozzle and extending in spaced relationship over the periphery of said turbine wheel, said sliding fit relationship being sufficiently great to permit relative axial movement between the nozzle and the shroud during all operating temperatures of the engine and being sufficiently small to maintain the shroud in spaced relationship over the outer periphery of the turbine wheel during all operating temperatures of the engine, a turbine scroll assembly piloted from said turbine wheel shroud, said turbine scroll assembly being supported by said housing in a sliding fit relationship to permit differential expansion and contraction between said turbine scroll assembly and said housing, a portion of said turbine scroll assembly engaging the ends of said turbine wheel shroud to limit the axial movement thereof with respect to said turbine nozzle.

2. In a gas turbine engine, a housing, a turbine wheel including a shaft rotatably supported in said housing, a turbine nozzle, means for supporting said turbine nozzle adjacent said turbine wheel, a turbine wheel shroud supported by said turbine nozzle and extending in spaced relationship over the periphery of said turbine wheel, said housing having a radially extending portion and an axially extending portion, a turbine scroll assembly piloted from said turbine wheel shroud, said turbine scroll assembly having a radially extending portion secured to said radially extending portion of said housing in a sliding fit relationship to permit expansion and contraction of said turbine scroll assembly relative to said housing in a radial direction, said turbine scroll assembly also having an axially extending portion positioned in a sliding fit relationship against said axially extending portion of said housing to permit axial expansion and contraction of said turbine scroll assembly relative to said housing in an axial direction.

3. In a gas turbine engine, a housing, a turbine wheel including a shaft rotatably supported in said housing, a turbine nozzle, means for supporting said turbine nozzle adjacent said turbine wheel, a turbine wheel shroud positioned in a sliding fit relationship over said turbine nozzle and supported thereby, said turbine shroud extending in spaced relationship over the periphery of said turbine wheel, the outer peripheral dimension of said turbine nozzle being smaller than the inner peripheral dimension of said shroud by an amount large enough to permit axial movement between the turbine nozzle and the shroud during all operating conditions of the engine and by an amount small enough to maintain the shroud in spaced relationship over the periphery of the turbine wheel during all operating conditions of the engine, said housing having a radially extending portion and an axially extending portion, a turbine scroll assembly piloted from said turbine wheel shroud, said turbine scroll assembly having a radially extending portion secured to said radially extending portion of said housing in a sliding fit relationship to permit expansion and contraction of said turbine scroll assembly relative to said housing in a radial direction, said turbine scroll assembly also having an axially extending portion positioned in a sliding fit relationship against said axially extending portion of said housing to permit axial expansion and contraction of said turbine scroll assembly relative to said housing in an axial direction, a portion of said turbine scroll assembly engaging the ends of said turbine wheel shroud to limit the axial movement thereof with respect to said turbine nozzle.

4. In a gas turbine engine, a housing, a turbine wheel including a shaft rotatably supported in said housing, a turbine nozzle supported adjacent said turbine wheel, a turbine wheel shroud supported by said turbine nozzle and extending in spaced relationship over the periphery of the turbine wheel, the outer periphery of said turbine nozzle and the inner periphery of said shroud being so dimensioned to provide a sliding fit clearance between the nozzle and the shroud, said clearance being sufficiently great to maintain said sliding fit clearance during all operating temperatures of the engine and being sufficiently small to maintain the shroud in spaced relationship over the periphery of the tubine wheel during all operating conditions of the engine, whereby relative axial movement between said turbine wheel shroud and said turbine nozzle is permitted during all operating temperatures of the engine.

5. In a gas turbine engine, a housing, a turbine wheel including a shaft rotatably supported in said housing, a turbine nozzle supported by said housing adjacent said turbine wheel, a turbine shroud positioned in a sliding fit clearance over said turbine nozzle and supported thereby, said turbine shroud extending in spaced relationship over the periphery of said turbine wheel, the sliding fit clearance between said turbine nozzle and said turbine shroud being large enough to maintain a sliding fit relationship between said turbine shroud and said turbine nozzle during all operating temperatures of the engine, and small enough to maintain the shroud in spaced relationship over the periphery of the turbine wheel during all operating temperatures of the engine, a turbine scroll assembly piloted from said turbine shroud and having means engaging the ends of said turbine shroud, said turbine scroll assembly engaging said housing in a sliding fit relationship.

References Cited in the file of this patent

UNITED STATES PATENTS

| | | |
|---|---|---|
| 2,427,244 | Warner | Sept. 9, 1947 |
| 2,429,990 | Burgess | Nov. 4, 1947 |
| 2,488,875 | Morley | Nov. 22, 1949 |
| 2,494,328 | Bloomberg | Jan. 10, 1950 |
| 2,654,566 | Boyd et al. | Oct. 6, 1953 |
| 2,925,245 | Lusch | Feb. 16, 1960 |
| 2,925,998 | Hayes | Feb. 23, 1960 |

FOREIGN PATENTS

| | | |
|---|---|---|
| 345,888 | Great Britain | Apr. 2, 1931 |
| 705,381 | Great Britain | Mar. 10, 1954 |